United States Patent [19]

Ueda

[11] Patent Number: 5,521,828
[45] Date of Patent: May 28, 1996

[54] UNIT AND METHOD FOR SETUP-CHANGE INSTRUCTION AND THE PRODUCTION SYSTEM

[75] Inventor: Yoshio Ueda, Itami, Japan

[73] Assignee: Mitsubishi Denki Kabushiki Kaisha, Tokyo, Japan

[21] Appl. No.: 185,017

[22] Filed: Jan. 24, 1994

[30] Foreign Application Priority Data

Jan. 25, 1993 [JP] Japan .................................. 5-009801

[51] Int. Cl.⁶ .................................................. G06F 17/60
[52] U.S. Cl. ............................................ 364/468; 364/402
[58] Field of Search .................................. 364/401, 402, 364/468, 474.11, 474.21

[56] References Cited

U.S. PATENT DOCUMENTS

| | | | |
|---|---|---|---|
| 4,888,692 | 12/1989 | Gupta et al. | 364/402 |
| 5,155,679 | 10/1992 | Jain et al. | 364/402 |
| 5,285,392 | 2/1994 | Kyle et al. | 364/468 |

FOREIGN PATENT DOCUMENTS

| | | |
|---|---|---|
| 1-109059 | 4/1989 | Japan . |
| 1-121155 | 5/1989 | Japan . |

*Primary Examiner*—Roy N. Envall, Jr.
*Assistant Examiner*—Steven R. Garland
*Attorney, Agent, or Firm*—Leydig, Voit & Mayer

[57] ABSTRACT

A unit and method for dispatching setup-change instructions and the production system. The unit comprises a work-in-progress information input section, a production information input section, a production unit information input section and a control unit. The method for setup-change instruction is achieved by the steps of creating production phase data, updating production phase data and dispatching instructions about the timing of changing the setup of each production unit. The production system comprises a production line, a setup-change instruction unit and a setup-change unit.

11 Claims, 8 Drawing Sheets

| LOT NO. | PROCESS CURRENT-LY IN PROGRESS | PRODUCTION CONDITION | AMOUNT OF PRO-DUCTION TIME | ARRIVAL TIME | PRODUCTION STATE |
|---|---|---|---|---|---|
| 101 | 5 | f | 2.0H | 13:00 | △ |
| 102 | 3 | e | 3.0H | 12:00 | △ → 1 |
| ⟨ | | | | | |
| 110 | 2 | k | 1.5H | 12:30 | △ → 1 |
| ⟨ | | | | | |
| 113 | 1 | b | 2.0H | 11:00 | △ → 1 |
| 114 | 1 | b | 2.0H | 11:15 | △ |

FIG. 4

| PRODUCTION UNIT NO. | PROCESS UNDER CONSIDERATION | MAXIMUM NUMBER OF PROCESSING BATCHES | CURRENT PRO-DUCTION CONDITION | IDLE STATUS |
|---|---|---|---|---|
| A01 | 1 | 1 | △ | △ → 1 |
| A02 | 5 | 1 | △ | △ → 1 |
| B01 | 3 | 3 | △ | △ |
| C01 | 2 | 1 | a | △ → 1 |
| C02 | 2 | 1 | △ | △ |
| D01 | 4 | 1 | △ | △ |

FIG. 5

| PROCESS ORDER | | 1 | | 2 | | 3 | |
|---|---|---|---|---|---|---|---|
| LOT NO. | PROCESS | PRODUCTION CONDITION | AMOUNT OF PRODUCTION TIME | PROCESS | PRODUCTION CONDITION | AMOUNT OF PRODUCTION TIME | PROCESS | PRODUCTION CONDITION | AMOUNT OF PRODUCTION TIME |
| 110 | 1 | a | 2.0H | 2 | k | 1.5H | 3 | k | 3.5H |
| 113 | 1 | b | 2.0H | 2 | b | 2.5H | 3 | m | 4.0H |

| | 4 | | 5 | |
|---|---|---|---|---|
| PROCESS | PRODUCTION CONDITION | AMOUNT OF PRODUCTION TIME | PROCESS | PRODUCTION CONDITION | AMOUNT OF PRODUCTION TIME |
| 4 | △ | 1.5H | 5 | f | 2.0H |
| 5 | f | 2.0H | | | |

FIG. 6

| PRODUCTION UNIT NO. | LOT NO. | PROCESS | PRODUCTION CONDITION | STARTING TIME | TERMINATION TIME | PROCESS COMPLETION CATEGORY |
|---|---|---|---|---|---|---|
| A01 | 113 | 1 | b | 13:00 | 15:00 | △ |
| A02 | 102 | 5 | e | 13:00 | 16:00 | △ |
| C01 | 110 | 2 | k | 13:00 | 13:00 | △ |

FIG. 7

| PRODUCTION UNIT NO. | LOT NO. | PROCESS | PRODUCTION CONDITION | STARTING TIME | TERMINATION TIME | PROCESS COMPLETION CATEGORY |
|---|---|---|---|---|---|---|
| C01 | 110 | 2 | k | 13:00 | 14:30 | △ → 1 |
| C01 | 111 | 2 | l | 14:30 | 16:30 | △ |

FIG. 8

| PRODUCTION UNIT NO. | PROCESS UNDER CONSIDERATION | MAXIMUM NUMBER OF PROCESSING BATCHES | CURRENT PRODUCTION CONDITION | IDLE STATUS |
|---|---|---|---|---|
| C01 | 2 | 1 | k | 1 → △ |

FIG. 9

| LOT NO. | PROCESS CURRENTLY IN PROGRESS | PRODUCTION CONDITION | AMOUNT OF PRODUCTION TIME | ARRIVAL TIME | PRODUCTION STATE |
|---|---|---|---|---|---|
| 110 | 3 | k | 3.5H | 14:30 | △ |

FIG. 10

UNIT AND METHOD FOR SETUP-CHANGE INSTRUCTION AND THE PRODUCTION SYSTEM

BACKGROUND OF THE INVENTION

1. Field of the Invention

The present invention relates to the unit and method for transmitting setup-change instructions according to the order of the products which flow through respective production units as well as estimates of the loads on the respective production units in a production line. Further, the present invention also relates to a production system which is equipped with a setup-change instruction unit.

2. Description of the Related Art

In a production line which is not specialized in a particular product allowing a variety of products to flow thereon, determining when the setup of each processing unit should be changed is a very important factor which affects the amount and the timing of production of the production line. However, the loads on respective production units in the production line may change because the production order and required time vary depending on the product type. Thus, conventionally, a production unit which has the heaviest load is selected according to the work-in-progress condition of the production line, the order of production in that production unit is determined and then the same order is given to the other units as an instruction for setup-change.

However, as described above, the loads on respective production units change depending on the product type and a bottlenecked production unit which has the heaviest load also changes. Further, some production units are sometimes stopped due to problems or inspection. The load on respective production units always changes with the passage of time. Therefore, in the prior art, a change of the load has been coped with by the operator checking the load repeatedly in short intervals. For this reason, it takes time and effort to determine the timing of setup-change and it is difficult to determine the timing of setup-changes accurately.

SUMMARY OF THE INVENTION

Accordingly, objects of the present invention are to solve the problems described above and provide a unit and method for setup-change instruction which are capable of estimating the loads on respective production units and of dispatching accurate instructions for setup-change.

Another object of the present invention is to provide a production system which is equipped with such a setup-change instruction unit.

According to the present invention, there is provided a setup-change instruction unit comprising a work-in-progress information input section for inputting information related to the work-in-progress condition of products being processed in a production line having a plurality of production units; a production information input section for inputting production information related to processing to be performed on respective products; a production unit information input section for inputting production unit information related to the specifications of each production unit; a running time input section for inputting the running time for each process of the respective production units; and a control unit which estimates the future production suspension conditions of each product and the idle status of each production unit on the basis of work-in-progress information input from the work-in-progress information input section, production information input from the production information input section, production unit information input from the production unit information input section and running time input from the running time input section; which creates production phase data related to matching products which can be processed, to production units, and outputs setup-change instructions due to a change of the product type in each production unit according to the production phase data.

According to another aspect of the present invention, there is provided a production system comprising a production line containing a plurality of production units; a setup-change instruction unit which estimates the future production suspension condition of respective products and the idle status of respective production units according to work-in-progress information related to the condition of products being processed in said production line, production information related to production to be performed on respective products, production unit information related to the specifications of the respective production units, and running time for each process of the respective production unit; which creates production phase data related to matching products which can be processed, to production units and outputs setup-change instructions due to a change of the product type in each production unit according to said production phase data; and a setup-change unit which changes the setup of production unit in said production line according to setup-change instructions output from said setup-change instruction unit.

DESCRIPTION OF THE PREFERRED EMBODIMENTS

The preferred embodiments of the present invention will now be described with reference to the accompanying drawings.

Figure 1A:
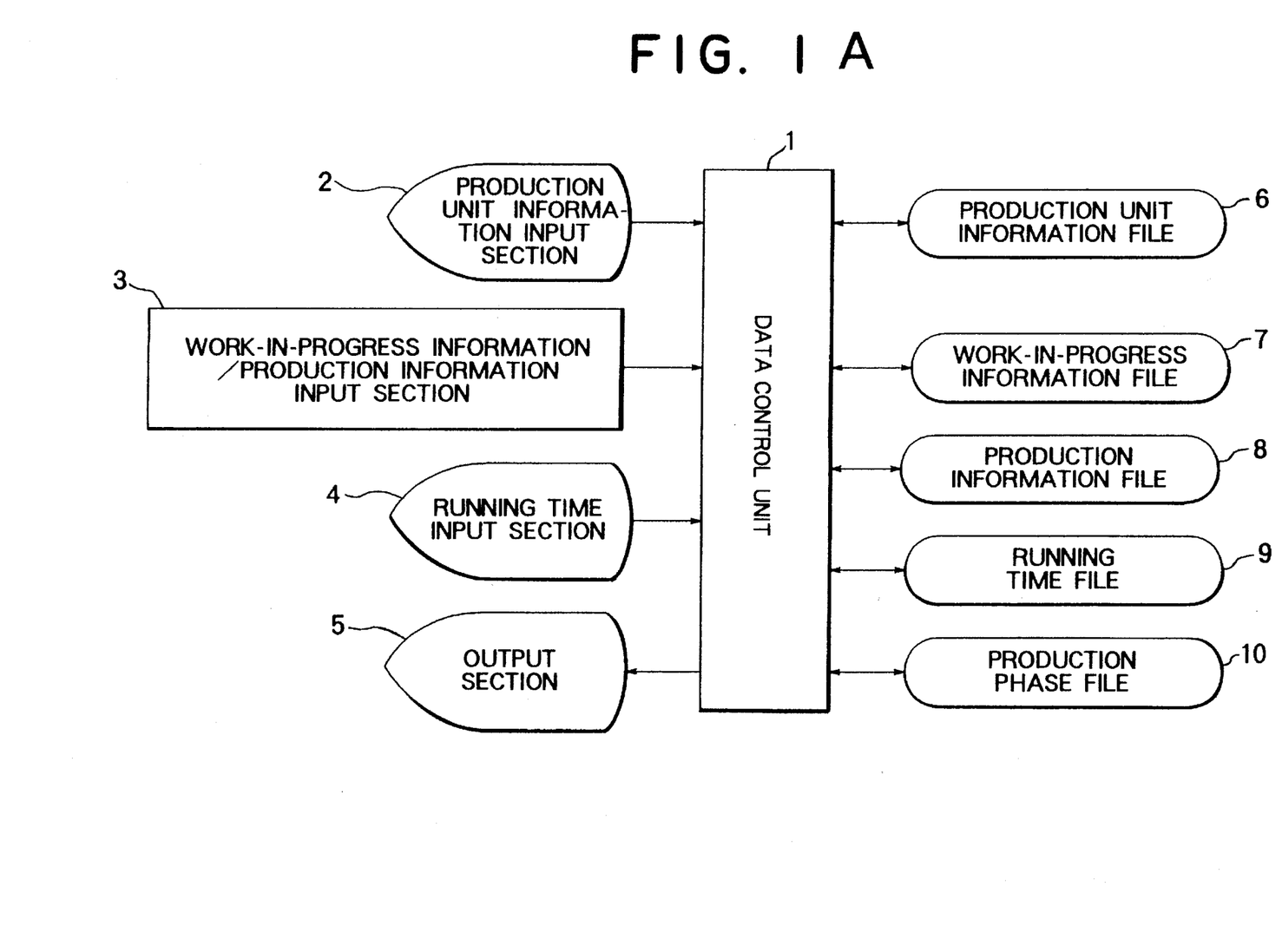
FIG. 1A is a block diagram showing the construction of a setup-change instruction unit according to the first embodiment.

FIG. 1A is a block diagram showing the structure of a setup-change instruction system according to an embodiment of the present invention. A production unit information input section 2 for inputting production unit specifications, a work-in-progress information/production information input section 3 for inputting information about works in progress in a production line and production information, a running time input section 4 for inputting estimated times, and an output section 5 for outputting load estimates and setup-change instructions are connected to a data control unit 1 which comprises a CPU. Further, a production unit information file 6, a work-in-progress information file 7, a production information file 8, a running time file 9 and a production phase file 10 are connected to the data control unit 1.

The production unit specification input from the production unit information input section 2 is stored in the production unit information file 6, the work-in-progress information and the production information input from the work-in-progress information/production information input section 3 are stored in the work-in-progress information file 7 and the production information file 8, respectively, and the estimated time input from the running time input section 4 is stored in the running time file 9. Additionally, the running time file 9 stores the running times of each production unit and corresponding processes. The data control unit 1 estimates future production phases in accordance with these input data, and production phase data representing the future production phases are stored in the production phase file 10. The data control unit 1 outputs production unit load estimates and setup-change instructions in accordance with the production phase data through the output section 5.

Figure 1B:
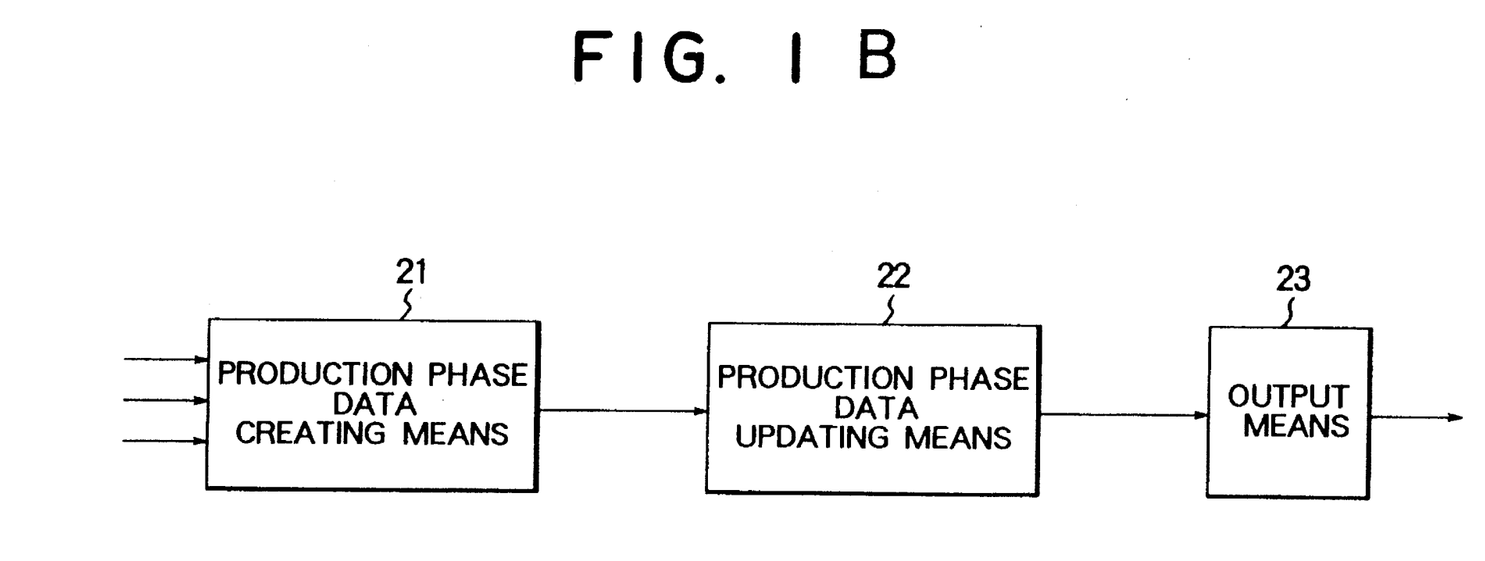
FIG. 1B is a block diagram showing the construction of a control unit according to the first embodiment of the present invention.

FIG. 1B is a block diagram showing the construction of the data control unit 1 shown in FIG. 1A.

A production phase data creating means 21 receives work-in-progress information and production information which are input from the work-in-progress information/production information input section 3 and production unit information input from the production unit information input section 2 to create production phase data for each production phase. A production phase data updating means 22 updates production phase data output by the production phase data creating means 21 each time a single phase is finished. When all phases are completed, an output means 23 outputs a setup-change timing of each production unit in accordance with production phase data updated by the production phase data updating means 22.

The operation of this embodiment will now be described with reference to the flow chart in FIG. 2. In step S1, the data control unit 1 sets a time when work-in-progress information has been input from the work-in-progress information/production information input section 3 as a starting time Ts of the production phase estimation. The data control unit 1 sets a final time Te of the production phase estimation by adding an estimated time input from the running time input section 4 to the starting time Ts and sets the starting time Ts as current time Tp. FIG. 3 shows an example of work-in-progress information, in which processes currently in progress, and production conditions, amount of production time, product arrival times and production states in those stages for lots 101– 114 are shown. As regards production states, production suspension and production in-progress are represented by "Δ" and "1", respectively.

Figure 4:
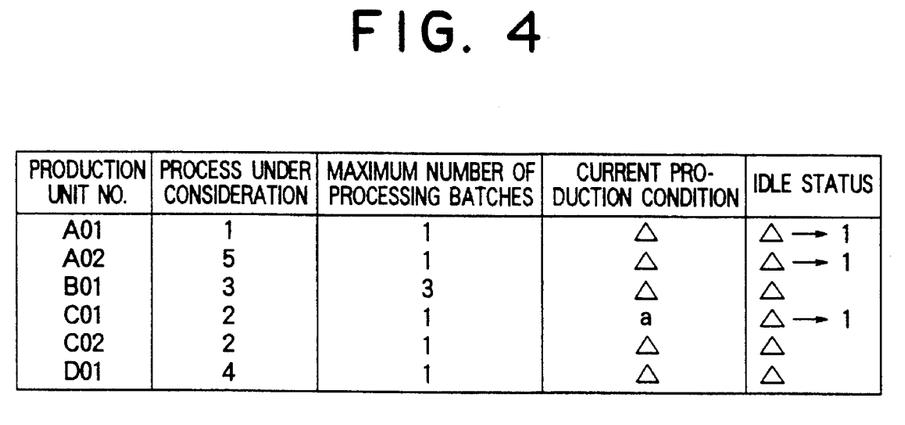
FIG. 4 is a table showing production unit information according to the first embodiment.
Figure 5:
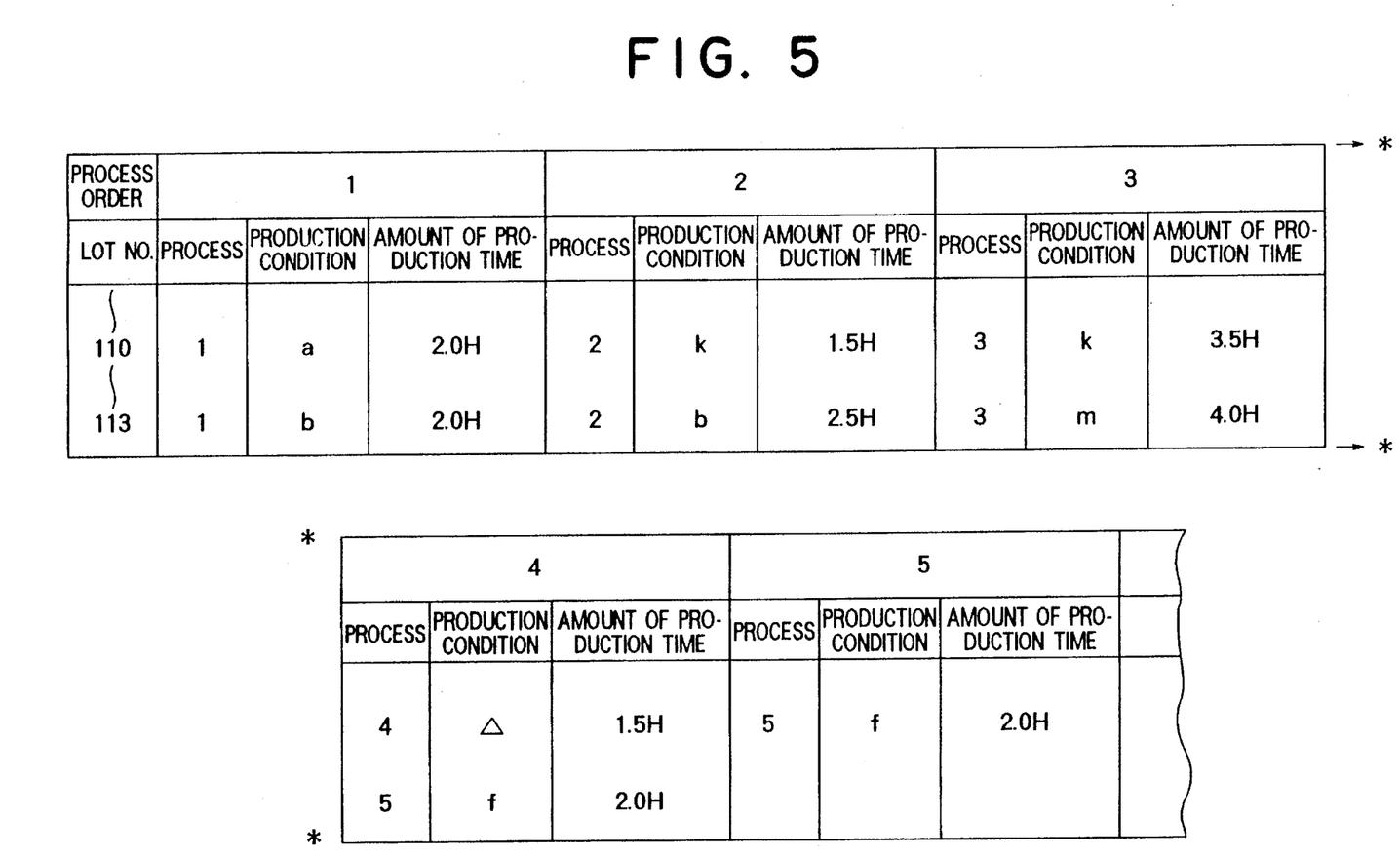
FIG. 5 is a table showing processing information according to the first embodiment.

In step S2, the data control unit 1 reads information about products which are in progress but are temporarily suspended and information about the production unit from the work-in-progress information file 7 and the production unit information file 6. In step S3, taking the production information in the production information file 8 into account, the data control unit 1 determines whether or not the products being processed can be matched to a production unit. FIG. 4 shows an example of the production unit information, in which processes being considered, maximum numbers of batches, current processing conditions and idle status are shown for production units A01–D01. FIG. 5 shows an example of production information, in which the order of production, production conditions and amount of production time are indicated for each respective lots.

Figure 6:
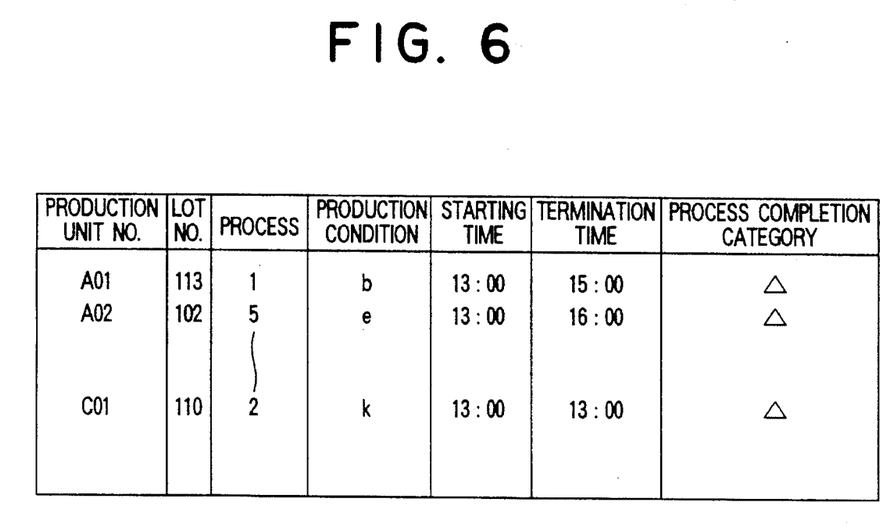
FIG. 6 is a table showing production phase data according to the first embodiment.

If, in step S3, it is determined that it is possible to match products being processed to production units, then in step S4, the amount of production time is read out from the production phase file 8 and the amount of production time is added to the current time Tp to obtain the time when production phase terminates, Tf. In step S5, the production phase data about the products being processed and the production unit are stored in the production phase file 10 and the production state of the products being processed and the idle status of the production unit are set to "1" which indicates the products are under production. FIG. 6 shows an example of production phase data which have been created by the data controller "1" at this time, in which lot Nos., the stages of production, production conditions, startup times, termination times, and process completion categories which correspond to each respective production unit are indicated. As regards the process completion category, incomplete and complete states are represented with "Δ" and "1", respectively. In step S5, the production states of lots 102, 110 and 113 shown in FIG. 3 and the idle status of the production units A01, A02 and C01 shown in FIG. 4 are set to "1" which means the products are under production.

The steps S2–S5 described above are repeated while there are products being processed which can be matched with production units.

If, in step S3, it is determined that there are no products being processed which can be matched to production units, the procedure proceeds to the step S6, so that the data control unit 1 reads out respective production phase from the production phase file 10 and determines whether there is any production phase which has not been completed in step S7. If it is determined that there is a phase which has not been completed, then in step S8, a phase the termination time Tf of which is the first of the production phases which have not been completed is selected and the termination time Tf of the selected production phase is set to the current time Tp.

For example, as regards production phases shown in FIG. 6, the phase that the production unit C01 is matched to the lot 110 has not yet been completed and has the first termination time Tf. The termination time 14:30 is set to the current time Tp.

In the subsequent step S9, if it is determined that the current time Tp does not exceed the final time Te of the production phase estimate, then in step S10, any production phase which has not been completed is read out from the production phase file 10. In step S11, it is determined whether there is a production phase which has the same termination time Tf as the current time Tp in these production phases.

If there is a production phase which has the same termination time Tf as the current time Tp, then in step S12, the production information of a product which is subject to the production phase is read from the production information file 8 and the production in-progress data and the production conditions data stored in the work-in-progress information file 7 are updated to those of the next process. Then, the production state is set to "production suspension". Further, corresponding to production unit information about the production unit undergoing the production phase, the idle status is changed to a "production suspension" and the process completion category of the production phase data is set to the "complete condition".

Figure 7:
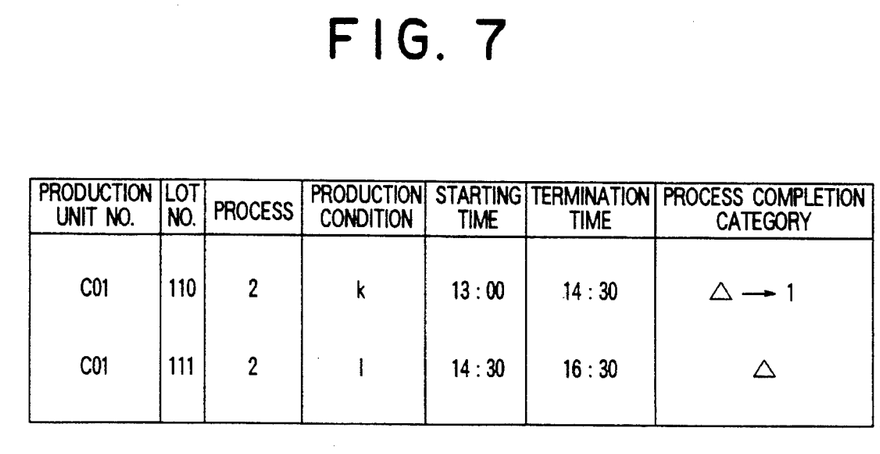
FIG. 7 is a table showing production phase data according to the first embodiment.
Figure 8:
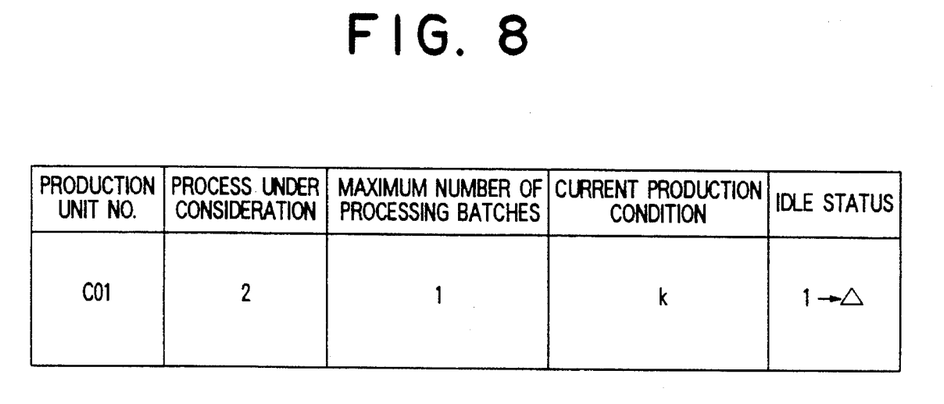
FIG. 8 is a table showing production unit information according to the first embodiment.
Figure 9:
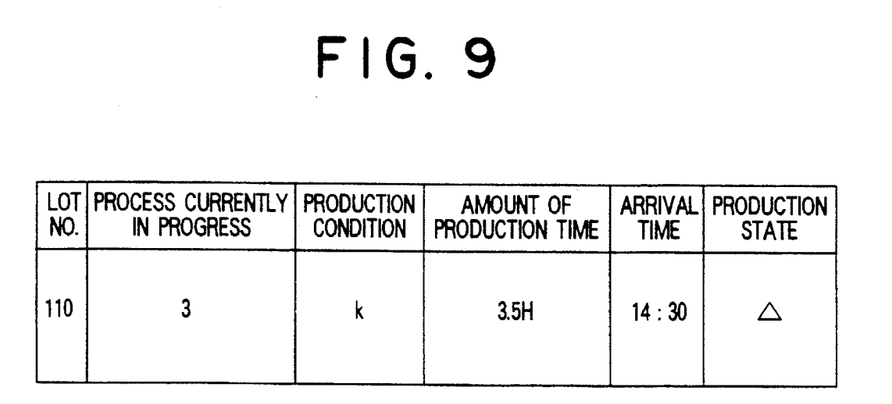
FIG. 9 is a table showing work-in-progress information according to the first embodiment.

For example, because a phase where the unit C01 is matched to the lot 110 has the same termination time Tf as the current time Tp, the completion category of the production phase data of this phase is updated from "Δ" to "1" as shown in FIG. 7. The idle status of the production unit C01 contained in the production unit information is updated from "1" to "Δ", as shown in FIG. 8. Further, because the next process, that is, the third process for this lot is "process 3" as evident from FIG. 5, each respective data of the lot 110 in the work-in-progress information are updated to those of the next process as shown in FIG. 9 while the production condition is set to "Δ" indicating the production suspension state.

The aforementioned steps S9–S12 are repeated while there are production phases having the same termination time Tf as the current time Tp. If it is determined that there is no production phase having the same termination time Tf as the current time Tp in step S11, the procedure returns to step S2 so that new production phase data is generated.

If, in step S7, it is determined that no incomplete production phase is present or if, in step S9, it is determined that the current time Tp exceeds the final time Te for production phase estimation, the procedure proceeds to step S13, in which the output section 5 specifies a process or production unit. In step 14, the production phase file 10 and the running time file 9 are read out and in step S15, production phase data and a running time are extracted for the specified process and production unit. Further, the load conditions of the production unit are output to the output section 5 and the timing for setup-change to change product type according to the production order in the production unit is output for each production unit through the output section 5.

According to the configuration described above, it is possible to generate accurate production phase information on the basis of work-in-progress condition, production information about products being processed and production unit information. For this reason, it is possible to determine a product, production order and the timing of product type change for each production unit, thereby largely improving the estimation accuracy of the setup-change timing.

Figure 2:
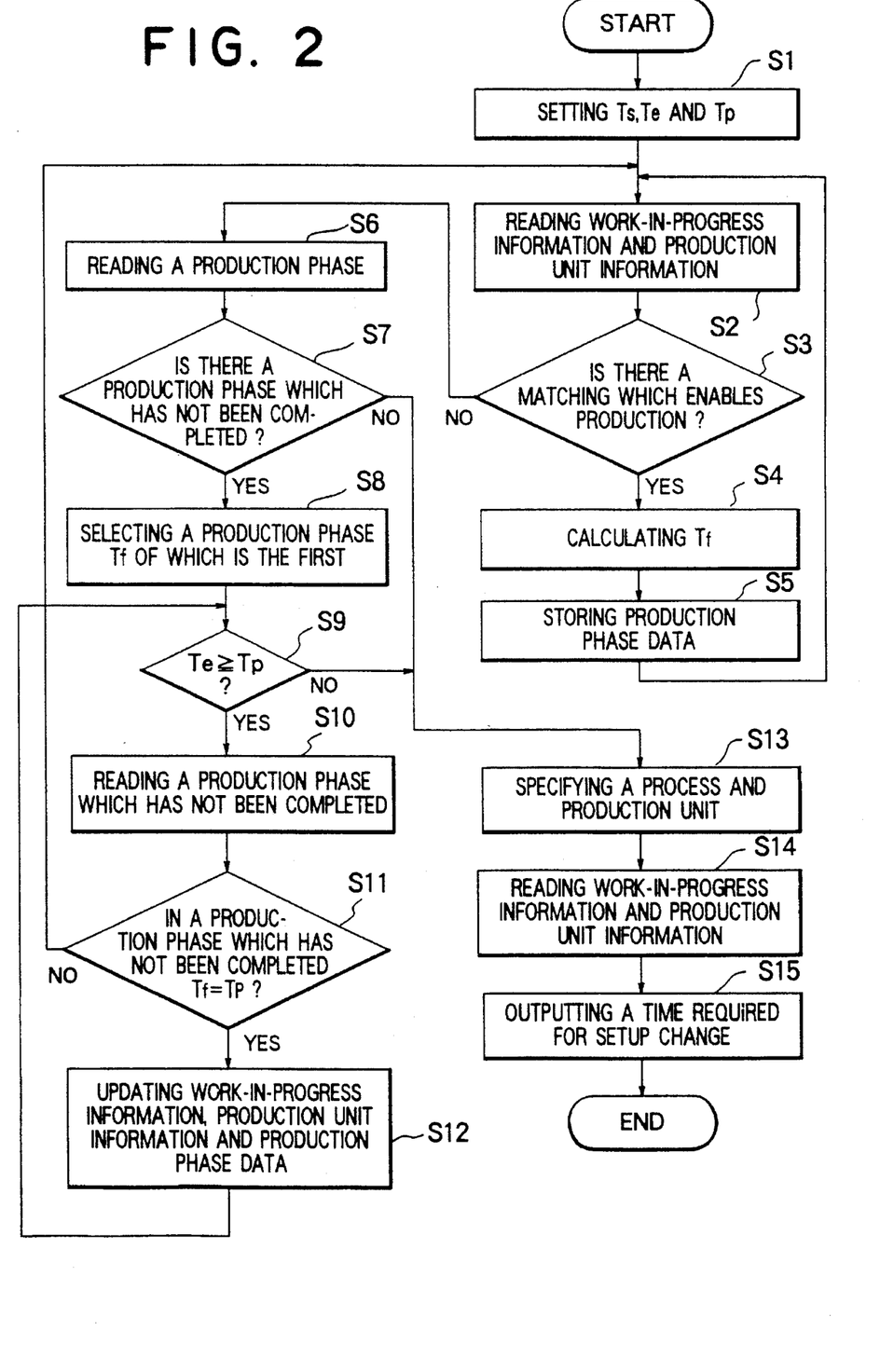
FIG. 2 is a flow chart showing the operation of the first embodiment.
Figure 3:
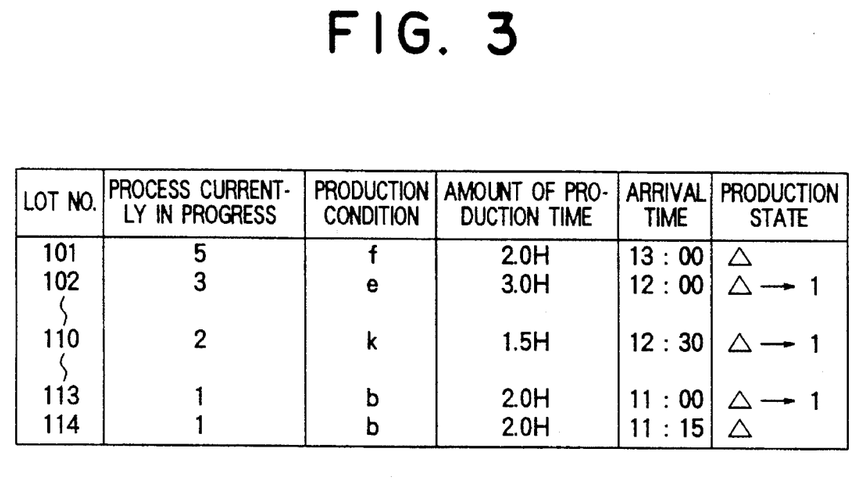
FIG. 3 is a table showing work-in-progress information according to the first embodiment.

Because the arithmetic operational processing at respective steps shown in FIG. 2 can be performed by means of a computer, it is possible to calculate the timing of setup-change accurately and quickly in order to give instructions to operators. As a result, various benefits can be obtained such as reductions of system down time required for setup-change, the number of products still being processed and the time required for arranging processing orders.

Although, in the embodiment described above, the work-in-progress information/production information input section 3 is used, it is possible to provide the work-in-progress information input section for inputting work-in-progress information and the production information input section for inputting production information independently.

Figure 10:
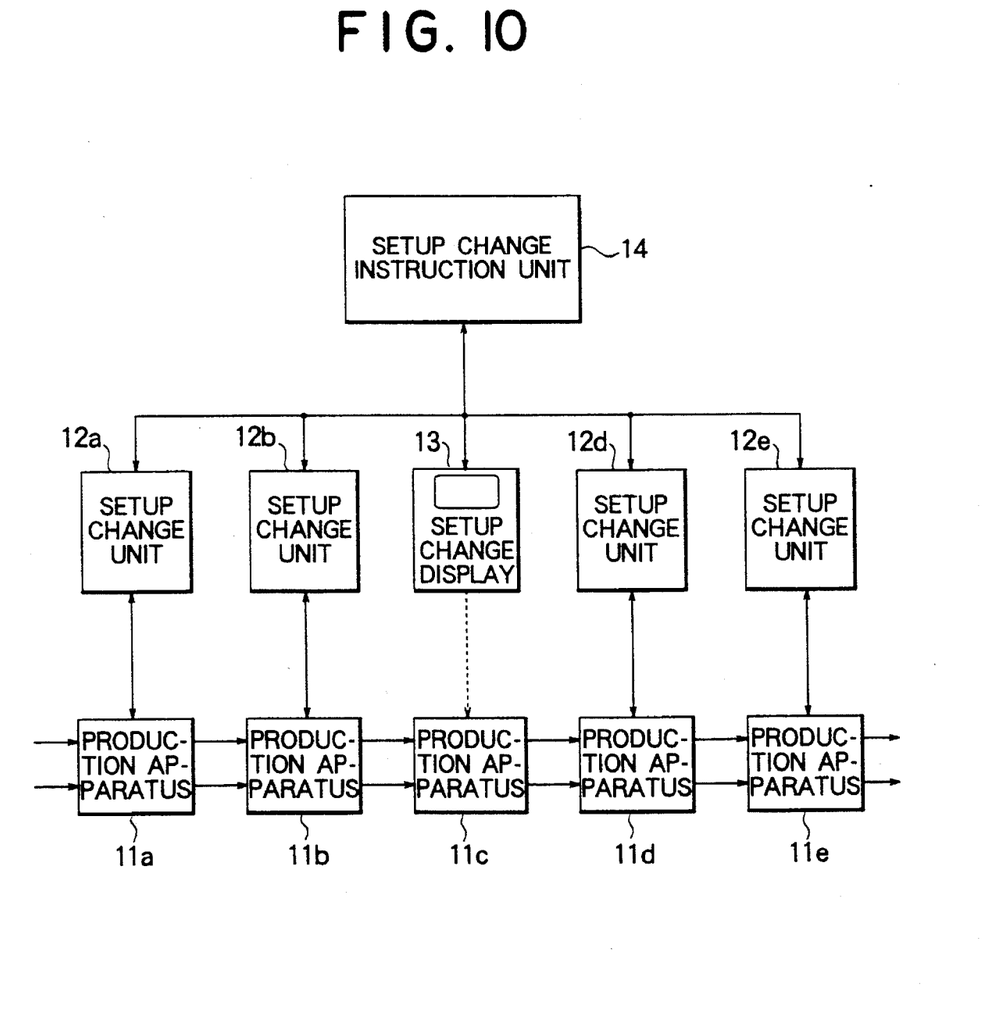
FIG. 10 is a block diagram showing the production system according to the second embodiment of the present invention.

FIG. 10 is a block diagram showing the production system which employs the setup-change instruction unit shown in FIG. 1A. Setup-change units 12a, 12b, a setup-change display 13 and setup-change units 12d, 12e are connected to production apparatuses 11a, 11b, 11c, 11d and 11e which constitute each production unit, respectively, and a setup-change instruction unit 14 is connected to the setup-change units 12a, 12b, 12d, 12e and the setup-change display 13. When the setup-change units 12a, 12b, 12d and 12e receive a setup-change instruction from the setup-change instruction unit 14, they change the setups of the corresponding production apparatuses 11a, 11b, 11d and 11e. The setup-change display 73 is provided with output devices such as a CRT and a printer and displays the content of a setup-change when the setup-change display receives a setup-change instruction from the setup-change instruction unit 14.

If the setup-change instruction unit 14 outputs the content and timing of a setup-change estimate with high precision to setup-change units 12a, 12b, 12d and 12e, these units change the setups of the corresponding production apparatuses 11a, 11b, 11d and 11e. When the timing and the content of the setup-change are output by the setup-change instruction unit 14 to the setup-change display 13, they are displayed on a display unit of the setup-change display 13. Consequently, operators can change the setup of the production apparatus 11c quickly. Construction of the production system as described above enables a very effective operation of the production line.

What is claimed is:

1. A setup-change instruction unit comprising:
   a work-in-progress information input section for inputting information related to a work-in-progress state of products being processed in a production line having a plurality of production units;
   a production information input section for inputting production information related to processing to be performed on respective products;
   a production unit information input section for inputting production unit information related to specifications of each production unit; and
   a control unit for estimating future production of each product and idle status of each production unit in response to work-in-progress information input from said work-in-progress information input section, production information input from said production information input section, and production unit information input from said production unit information input section, for producing production phase data for matching of products to be processed to production units, and for outputting setup-change instructions due to a change of product type in each production unit according to the production phase data.

2. The setup-change instruction unit according to claim 1 wherein said control unit comprises:
   production phase data creating means for matching a product being processed to production units and for producing production phase data in response to work-in-progress information input from said work-in-progress information input section, production information input from said production information input section, and production unit information input from said production unit information input section;
   production phase data updating means for updating production phase data produced by said production phase data creating means each time a single production phase is finished; and
   output means for outputting timing of a setup-change in each production unit in response to production phase data updated by said production phase data updating means when all production phases are finished.

3. The setup-change instruction unit according to claim 2 wherein said control unit comprises load condition output means for outputting a load condition of respective production units in response to production phase data updated by said production phase data updating means.

4. The setup-change instruction unit according to claim 2 wherein said control unit comprises load condition output means for outputting load conditions of each specified process in response to production phase data updated by said production phase data updating means.

5. The setup-change instruction unit according to claim 1 wherein said work-in-progress information input section inputs work-in-progress information including a lot number, the process currently in progress, production conditions, amount of production time, arrival time and processing status.

6. The setup-change instruction unit according to claim 1 wherein said production information input section inputs production information containing a lot number and a plurality of process orders comprising the process currently in progress, production conditions, and amount of production time.

7. The setup-change instruction unit according to claim 1 wherein said production unit information input section inputs production unit information containing a production unit number, a process under consideration, a maximum number of processing batches, current production conditions, and idle status.

8. The setup-change instruction unit according to claim 1 wherein said control unit creates production phase data containing production unit, lot number, process, production conditions, starting time, termination time and process completion category.

9. A production system comprising:

a production line including a plurality of production units;

a setup-change instruction unit for producing production unit information for matching products to be processed to production units by estimating future product suspension and idle status of each production unit in response to work-in-progress information related to a product being processed in said production line, production information related to production to be performed on respective products, production unit information related to specifications of respective production units, and estimated time of each process in the respective production units and for outputting setup-change instructions due to a change of a product type for a production unit in response to production phase data; and a setup-change unit for changing setup of said production line according to a setup-change instruction output from said setup-change instruction unit.

10. The production system according to claim 9 wherein said setup-change instruction unit comprises:

production phase data creating means for producing production phase data by matching products being processed to production units in response to work-in-progress information, production information, and production unit information;

production phase updating means for updating the production phase data produced by said production phase data creating means each time a production phase is finished; and output means for outputting timing for changing setup of each production unit in response to production phase data updated by said production phase data updating means when all production phases are finished.

11. A method for setup-change instruction comprising:

creating production phase data for each of a plurality of production phases by matching products being processed to production units in response to 1) work-in-progress information including the condition of a product being processed in a production line, 2) production information for processing to be performed on each product, and 3) product unit information related to specifications of each production unit;

updating production phase data each time one of the plurality of production phases is finished; and dispatching instructions for timing of changing setup of each production unit in response to updated production phase data when all of the plurality of phases are finished.

* * * * *